Figure 6:
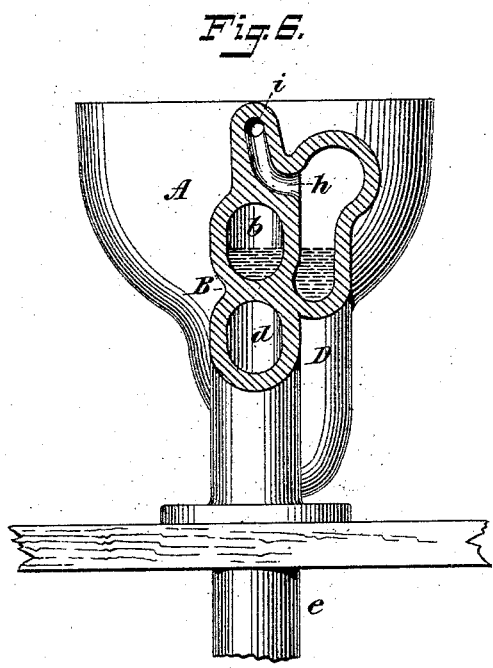

(No Model.) 2 Sheets—Sheet 1.
H. H. CRAIGIE.
SIPHON WATER CLOSET.
No. 399,184. Patented Mar. 5, 1889.
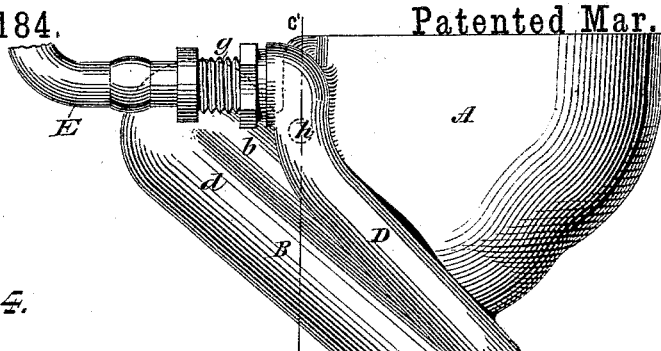
Fig. 1.
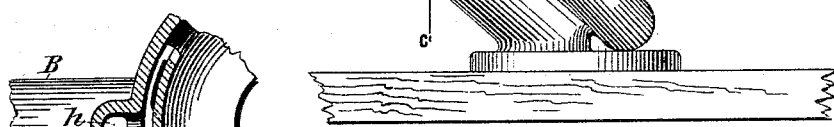
Fig. 4.
Fig. 2.
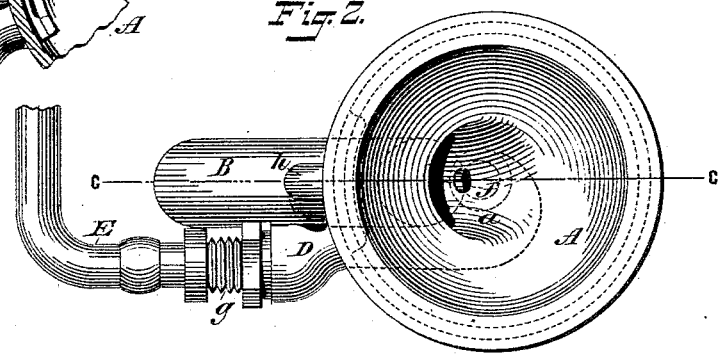
Fig. 5.
Fig. 3.
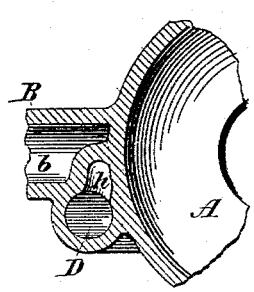
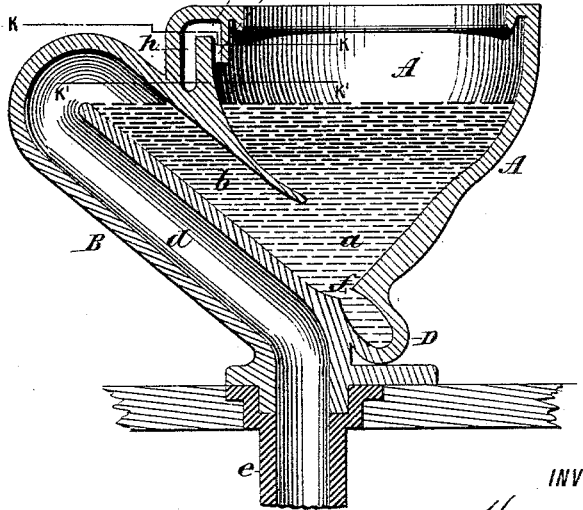
WITNESSES:
Gustave Dieterich
T. F. Bourne
INVENTOR,
Hugh H. Craigie
BY Briesen, Steele & Knauth
ATTORNEYS.
N. PETERS, Photo-Lithographer, Washington, D. C.

(No Model.)　　　　　　　　　　　　　　　　　2 Sheets—Sheet 2.

H. H. CRAIGIE.
SIPHON WATER CLOSET.

No. 399,184.　　　　　　　　　Patented Mar. 5, 1889.

WITNESSES:
Gustave Dieterich.
T. F. Bourne.

INVENTOR,
Hugh H. Craigie
BY Briesen, Steele & Knauth
ATTORNEYS.

UNITED STATES PATENT OFFICE.

HUGH H. CRAIGIE, OF STAMFORD, CONNECTICUT, ASSIGNOR TO JULIA CRAIGIE, OF SAME PLACE.

SIPHON WATER-CLOSET.

SPECIFICATION forming part of Letters Patent No. 399,184, dated March 5, 1889.

Application filed October 26, 1888. Serial No. 289,173. (No model.)

*To all whom it may concern:*

Be it known that I, HUGH H. CRAIGIE, of Stamford, Fairfield county, Connecticut, have invented an Improved Siphon Water-Closet, of which the following is a specification.

The object of my invention is to provide a water-closet in which a thorough and effective evacuation of its contents will take place when water is admitted to the closet, which closet shall be simple in construction and not liable to leakage or to permit the escape of gases.

The invention consists in the details of improvement, and the combinations of parts that will be more fully hereinafter set forth.

Reference is to be had to the accompanying drawings, forming part of this specification, in which—

Figure 1 is a side elevation of a water-closet containing my improvements. Fig. 2 is a plan view thereof. Fig. 3 is a vertical longitudinal section on the line $c\ c$, Fig. 2. Fig. 4 is a detail horizontal section on the line $k\ k$, Fig. 3. Fig. 5 is a similar view on the line $k'\ k'$, Fig. 3; and Fig. 6 is a vertical cross-section on the line $c'\ c'$, Fig. 1.

In the accompanying drawings, the letter A represents the bowl of a water-closet, which may be of suitable shape. In the lower part of the bowl A is an opening, $a$, that communicates with a siphon, B. The siphon B consists of two parallel tubes, $b\ d$, that are connected at their upper ends, as shown in Fig. 3. The lower end of the tube $b$ communicates with the opening $a$ in the bowl A, and is what I term the "short leg" of the siphon. The lower end of the tube $d$ may be connected in any suitable manner with the soil-pipe $e$. (See Fig. 3.)

I prefer to form the bowl A and the siphon B in one piece of earthenware, so that there will be no joints to permit leakage.

At the bottom of the water-closet bowl A is a jet-opening, $f$, that is in line with the short leg $b$ of the siphon B, and that communicates with the lower part of the bowl A. This jet-opening $f$ is in communication with a pipe, D, that extends upwardly along the side of the bowl A, and terminates near the upper edge of said bowl. I prefer to make the pipe D, jet-opening $f$, and bowl A in one integral piece of earthenware or other suitable material, so that there will be no danger of parts becoming loosened below the level of the water in the bowl, thereby preventing leakage.

The pipe D, I prefer to make considerably larger than the jet-opening $f$, so that water passing through the pipe D will issue from the jet-opening $f$ with considerable force.

The upper end of the pipe D is connected with a service-pipe, E, that extends from an overhead tank or from other suitable water-supply. The pipes D and E may be connected together by a coupling, $g$, that may be of any ordinary or suitable construction. The water from the tank or other source of supply passes from the service-pipe E to the pipe D, and thence issues from the jet-opening $f$ with great force up into the short leg $b$ of the siphon B, thereby causing the water contained in the siphon to pass from the leg $b$ into the leg $d$ of the siphon, thereby starting the siphoning of the water from the bowl and causing a complete evacuation thereof.

From the pipe D, preferably near its upper end, a tube, $h$, extends upwardly, as clearly shown in Fig. 6, which tube opens into the bowl A, near its upper edge, as at $i$, directly in line with a shield, $j$, that is carried on the inner side of the bowl A; but, if preferred, the tube $h$ could communicate with a perforated flushing-rim that extends around the upper edge of the bowl, as in ordinary water-closets. The water issuing from the tube $h$ is the flushing-water for the bowl and passes along the inner side of the bowl to clean the same. I prefer to connect the tube $h$ with the pipe D, slightly below the coupling $g$ on the same, as will be seen by dotted line in Fig. 1.

The water acts in my improved water-closet to evacuate and fill the same, as follows: Suppose the bowl A to be supplied with water extending up in the leg $b$ of the siphon about as shown in Fig. 3. Water is now admitted to the bowl to evacuate the same, which water passes from the service-pipe E through the coupling $g$ into the pipe D, down through the same, and issues with great force from the jet-opening $f$, being directed from said opening up into the short leg $b$ of the siphon. As the water thus passes up into the siphon, it forces the water contained in the siphon up over the sealing-point, thereby starting the siphoning. This siphoning draws all the water and other matter from the bowl up through the short leg b and discharges it into the downwardly-extending leg d, from whence it passes to the soil-pipe. While the siphoning is taking place water is still issuing from the jet-opening f and passing up the short leg b of the siphon, which assists in the evacuation of the water-closet, causing any solid matter that may be contained therein to quickly flow out. When the water is admitted to the pipe D, it seeks an outlet through the jet-opening f, but as said opening is much smaller than the pipe D the excess of water will back up in the pipe D until it reaches the opening of the tube h, when it will pass up through said tube and act to flush the bowl by issuing from the opening i and from behind the shield j, or by passing from the ordinary perforated flushing-rim, as before described. From this it will be seen that the flushing-water for the bowl does not enter the same by a direct downward flow of water from the tank or other water-supply; but that after the water has begun to issue from the jet-opening f to evacuate the bowl the excess of water contained in the pipe D passes upwardly from said pipe to the upper edge of the bowl A.

As will be seen from the drawings, I connect the service-pipe with the jet-supply pipe D above the normal level of the water in the bowl. By this means if the coupling-connections between the pipes D and E should become loosened from any cause the water from the bowl A cannot flow out or leak from this coupling-connection. Where the connection has been made below the water-level in the bowl, as in the water-closets heretofore constructed, if any leak occurred at the coupling the water from the bowl would leak out and do much damage in the building. By arranging the tube h so that the water will begin to flush the bowl after the water from the jet-opening f has started the siphon and the evacuation of the water-closet the flushing-water will not begin to fill the bowl while the bowl is being evacuated. By this means I effect a complete and thorough evacuation of the bowl. The water will continue to flow from the jet-opening f and up the short leg b of the siphon after all the water has passed from the bowl and until the afterflow takes place for replenishing the bowl with water. This afterflow begins as soon as the stream from the pipe D is divided, part escaping through flushing-opening i and the remainder through jet-opening f; but the latter part of the divided stream will not be strong enough to ascend the siphon, and will therefore help fill the bowl.

Having now described my invention, what I claim is—

1. The bowl A, having flushing-aperture i and water-supply pipes D h, the pipe h being wholly above the normal level of the water in the bowl and leading upward to said aperture i, and the pipe D extending higher than its connection with the pipe h, substantially as described.

2. The bowl A, having flushing-aperture i and water-supply pipes D h, the pipe h being wholly above the normal level of the water in the bowl and leading upward to said aperture i, and the pipe D extending higher than its connection with the pipe h, in combination with the lower jet-nozzle, f, and siphon B, substantially as described.

HUGH H. CRAIGIE.

Witnesses:
HARRY M. TURK,
T. F. BOURNE.